United States Patent
Okamoto et al.

(10) Patent No.: US 7,369,191 B2
(45) Date of Patent: May 6, 2008

(54) LIQUID CRYSTAL DISPLAY WITH ELASTIC GROUND CONTACT ON FIRST SIDE AND MULTIPLE GROUND CONTACTS ON SECOND SIDE OF DRIVE CIRCUIT BOARD

(75) Inventors: Hiroaki Okamoto, Tottori (JP); Masayoshi Nishiura, Tottori (JP); Hideaki Kishi, Tottori (JP); Katsumi Tanaka, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 252 days.

(21) Appl. No.: 10/543,598

(22) PCT Filed: Jan. 29, 2004

(86) PCT No.: PCT/JP2004/000819

§ 371 (c)(1),
(2), (4) Date: Jul. 27, 2005

(87) PCT Pub. No.: WO2004/068229

PCT Pub. Date: Aug. 12, 2004

(65) Prior Publication Data

US 2006/0139519 A1 Jun. 29, 2006

(30) Foreign Application Priority Data

Jan. 31, 2003 (JP) .............................. 2003-024202

(51) Int. Cl.
*G02F 1/1333* (2006.01)
(52) U.S. Cl. .......................................... 349/60; 349/58
(58) Field of Classification Search ............. 349/58–60
See application file for complete search history.

(56) References Cited

U.S. PATENT DOCUMENTS

| 5,680,183 | A | * | 10/1997 | Sasuga et al. | ................. 349/58 |
| 6,342,933 | B1 | | 1/2002 | Nakamura et al. | |
| 6,362,860 | B1 | * | 3/2002 | Sagawa | ....................... 349/59 |
| 6,490,016 | B1 | * | 12/2002 | Koura | .......................... 349/58 |

FOREIGN PATENT DOCUMENTS

| CN | 1353323 A | 6/2002 |
| JP | 10-153766 | 6/1998 |
| JP | 10153766 A | 6/1998 |
| JP | 2001-109390 | 4/2001 |

OTHER PUBLICATIONS

International Search Report mailed Mar. 30, 2004.

* cited by examiner

*Primary Examiner*—David Nelms
*Assistant Examiner*—John Heyman
(74) *Attorney, Agent, or Firm*—Katten Muchin Rosenman LLP

(57) ABSTRACT

A liquid crystal display comprises a liquid crystal module (10) having a predetermined shape and having a back side covered with a metal back case (12); a liquid crystal drive circuit board (20) electrically connected at one side of the liquid crystal module (10), extending toward the central portion from the one side by predetermined length, having an electric connector (22) disposed on one side of the circuit board (20), and mounted on the metal back case (12); and a metal cover (30) having a cutout (33) large enough to expose the electric connector (22) and covering the circuit board (20). An earth terminal (36) is provided at one edge of the cutout (33) and is brought into elastic contact with an earth contact (24a) provided on one side of the circuit board (20) when the circuit board (20) is covered with the metal cover (30). With this constitution, a stable ground line is formed in the display by a simple machining to avoid noise interference.

9 Claims, 5 Drawing Sheets

LIQUID CRYSTAL DISPLAY WITH ELASTIC GROUND CONTACT ON FIRST SIDE AND MULTIPLE GROUND CONTACTS ON SECOND SIDE OF DRIVE CIRCUIT BOARD

This application is a national stage entry under 35 U.S.C. § 371 of PCT/JP04/00819, filed Jan. 29, 2004, (designating the U.S.; and which was published in Japanese in WO 2004/068229 on Aug. 12, 2004), which claims the benefit of Japanese Patent Application No. 2003-024202, filed Jan. 31, 2003, the contents of which are incorporated herein by reference.

BACKGROUND OF THE INVENTION

1. Field of the Invention

The present invention relates to a small-sized liquid crystal display device particularly suitable for PDAs, car navigation systems, laptop personal computers, small-sized television sets and the like, and particularly to a liquid crystal display device in which a stable ground line is formed therein the display panel to eliminate noise interference.

2. Prior Art

In recent years, liquid crystal display devices have come to be widely used in various kinds of instruments such as PDAs, car navigation systems, laptop personal computers, small-sized television sets and the like, for example, particularly for being compact, light-weight, and low in electric consumption.

Such liquid crystal display devices normally comprise a liquid crystal display device in which an upper transparent glass substrate and a lower transparent glass substrate are superposed at a predetermined gap, such that pixel electrodes made of transparent conductive film and a surface on which orientation film or the like are laminated facing each other, both substrates being bonded by sealing material provided around the rim of both substrates and liquid crystal is filled between the substrates, and a polarizing plate is further installed outside the substrates, a liquid crystal drive circuit board arranged outside the liquid crystal display device for driving the same, a backlight arranged under the liquid crystal display device for supplying light thereto, a frame body for holding each member, a metal shield case (frame) that houses each member and the opening of the liquid crystal display window, and an electric connector for supplying power to the liquid crystal drive circuit board and the like from the outside.

Of these constituent parts, the electric connector is normally designed for attachment to the side of the frame. However, because the frame is made of metal that requires working, the process of attaching the connector to the side of the frame becomes rather complicated. In addition, because the connector protrudes from the outer portion of the frame, there have been cases where the connector breaks down or is otherwise damaged upon collision with an object or the like coming from the outside. Further, there are cases where the protruding connector is not only unaesthetic but also impairs the design of the liquid crystal display device.

Consequently, there is known a liquid crystal display in which the connector is not disposed on the metal frame, but where a liquid crystal filling portion is formed on one corner of a liquid crystal display board, a liquid crystal drive circuit board being arranged apart from the liquid crystal filling portion, a connector is mounted on an installation board for electronic parts adjacent to the liquid crystal filling portion, and a connector exposure hole is provided in the region of the outer frame opposite the connector (for an example, refer to claim 1, FIG. 3 and FIG. 14 of Japanese Laid-Open Patent Publication No. 6-265925).

Further, recently, the liquid crystal elements of the liquid crystal display device have been micro-fabricated, with a large number of various electronic parts densely mounted on the circuit board, such that wiring them has become extremely dense and complicated. Moreover, due to increasingly higher driving frequency of the liquid crystal display device, various kinds of noise have been generated therein, and together with noise from the outside or the like intruding the liquid crystal display device, it has become impossible to achieve stable display. As a countermeasure, a method has been proposed whereby a ground line is formed within the device to restrain or neutralize the impact of such noise.

The ground line is normally formed on the surface of the liquid crystal drive circuit board, and there is known in the prior art a method whereby a frame ground pad electrically connected to the ground line is connected by solder to the metallic shield case of the liquid crystal display device via a lead wire, and a method whereby a cut is provided on the metallic shield case and a piece of nail integrally provided on the shield case is directly affixed to the frame ground pad by solder to form the ground line (refer to the right column of page 2, the right column of page 3 and FIG. 1 of Japanese Laid-Open Patent Publication No. 6-265922).

On the other hand, small-sized liquid crystal display devices used in car navigation systems or the like, for example, have been equipped with various kinds of software to be highly functional. For example, some liquid crystal displays equipped with standard software are designed in such manner that other software can be installed thereinto, depending on the preference of the user.

For such purposes, however, the above-described liquid crystal display device is not suitable for use due to limited housing space and design restrictions, requiring various changes in circuit layout as well as circuit wirings on the circuit board, the shape of the board and frame and the like. Furthermore, the installation position of the electric connector and the ground line have also been altered to conform to these changes.

Such liquid crystal display devices are already in the market and publicly known. FIG. 5 shows the plane rear view of a liquid crystal display device for a car navigation system.

The liquid crystal display 1A comprises a liquid crystal module 10A, a liquid crystal drive circuit board 20A which is mounted on the back case of the liquid crystal module 10A, with a size measuring approximately one third the size of the module, an electric connector 22A which is mounted on the liquid crystal drive circuit board 20A, and a metal cover 30A, on which a cutout 33A has been cut out so as to expose the electric connector 22A residing on the liquid crystal drive circuit board 20A while covering the liquid crystal drive circuit board 20A. Electronic parts are then arranged to fit into the smallest liquid crystal drive circuit board 20A possible, the electric connector 22A being positioned slightly remote from the rim of the circuit board. Thus, the structure of the metal cover 30A for covering the liquid crystal drive circuit board 20A is widely cut out so as to expose the electric connector 22A. Note that reference numerals 14A to 14D denote fasteners for fixing cables or the like attached on the back case, while reference numeral 22B denotes an electric connector, and reference numerals 23A and 23B denote cables.

In the liquid crystal display 1A, the liquid crystal drive circuit board 20A is grounded by the metal cover 30A.

However, since the liquid crystal module 10A itself is covered by a metal case 12A which is connected to the metal cover 30A, the ground line has been omitted since there is no need to provide special electric connection means to connect the liquid crystal drive circuit board 20A to the metal cover 30A. Alternatively, special working is applied to the area near the central portion of the metal cover 30A, even though there is a provision for connection means, for the purpose of achieving connection.

As a result, when the ground line was not formed, or, when the ground line was not sufficient, countermeasures to prevent external noise from intruding the display device or to suppress the generation of noise within the display device became inadequate, making it difficult to achieve stability of display quality, and further causing the generation of unnecessary radiant waves that bring about electromagnetic interference (EMI). Upon investigation of the source of the noise, it has been further discovered that even the application of special working to the location near the central portion of the metal cover 30A provided with connection means is not a sufficient countermeasure against noise interference. Additionally, metal working such as the above-mentioned cutout was troublesome, since it was applied approximately near the central portion of the metal cover 30A.

DISCLOSURE OF THE INVENTION

Considering these circumstances, the inventors discovered that various kinds of noise are generated mainly by electric connectors and in the vicinity thereof. On the other hand, the inventors presume that even though the electrical connectors are covered by a metal cover due to design restrictions, if at least one of the connectors is exposed and the ground line is formed within the vicinity of the exposed connector or very close to the metal cover, any noise generated by the connectors can be efficiently controlled, greatly facilitating machining of the earth connection means.

Consequently, the present invention aims to provide a liquid crystal display device equipped with a stable ground line formed by a simple machining process for the purpose of eliminating noise interference.

The object of the present invention can be achieved by the following means.

The liquid crystal display device of the present invention comprises a liquid crystal module having a predetermined shape and a backside covered by a metallic back case, a liquid crystal drive circuit board mounted on the metallic back case and electrically connected to the edge of one side of the liquid crystal module, extending from the peripheral edge toward the central portion by a predetermined length, an electric connector(s) attached near the peripheral edge of the liquid crystal drive circuit board, and a metallic cover provided with a cutout large enough to expose the electric connector(s) and covering the liquid crystal drive circuit board, in which an earth terminal is provided on one peripheral edge of the cutout portion of the metal cover, and the earth contact is brought into elastic contact with an earth terminal provided on one side of the liquid crystal drive circuit board.

In this case, it is preferable that an integrated circuit device be provided on the liquid crystal drive circuit board of the liquid crystal display device, and the earth contact is disposed between the integrated circuit device and the electric connector(s).

Further, the integrated circuit device of the liquid crystal display may also be a timing controller for driving the liquid crystal module.

Further, it is preferable that the liquid crystal drive circuit board of the liquid crystal display device be mounted on the metallic back case while a spacer having a predetermined height is laid somewhere between the location of the earth contact and the metallic back case.

Further, it is preferable that the spacer of the liquid crystal display forms part of the locking protrusion for affixing the metal cover.

Further, it is preferable that multiple protrusions are formed on the metallic back case of the liquid crystal display and that the protrusions come into contact with an earth contact(s) provided on the other side of the liquid crystal drive circuit board.

Further, it is preferable that the number of earth contact(s) provided on another side of the liquid crystal drive circuit board, which comes into contact with the protrusions of the metallic back case in the liquid crystal display, be one or more and disposed below or within the vicinity of the lower part of the connecting surface of the electric connector(s).

Further, the liquid crystal display of the present invention comprises a liquid crystal module having a predetermined shape and a backside covered by a metallic back case, a liquid crystal drive circuit board mounted on the metallic back case and electrically connected at the edge of one side of the liquid crystal module, extending from the peripheral edge toward the central portion from the side edge by a predetermined length, and an electric connector(s) attached near the peripheral edge of the liquid crystal drive circuit board, in which multiple earth contacts and multiple protrusions are provided on one side of the liquid crystal drive circuit board and the metallic back case, respectively, whereby each of the earth contacts comes into elastic contact with the multiple protrusions to mount the liquid crystal drive circuit board onto the metallic back case.

In this case, it is preferable that one or more of the earth contacts provided on the liquid crystal drive circuit board be disposed below or within the vicinity of the lower part of the connecting surface of the electric connector(s).

Furthermore, it is preferable that the liquid crystal drive circuit board of the liquid crystal display be mounted on the metallic back case while a spacer(s) having a predetermined height is laid between the circuit board and the metallic back case.

In the liquid crystal display of the present invention, since the earth contacts reside within the vicinity of the liquid crystal drive circuit board where the connectors are disposed, the earth contacts are connected to the electronic parts and the like that are mounted on the liquid crystal drive circuit board to form the ground line, thereby efficiently controlling the generation of noise. Further, since the earth terminals of the liquid crystal display of the present invention reside on the peripheral edge of the cutout portion of the metal cover where the electric connectors are exposed, the earth terminals can be simultaneously set up together with the cutout portion, thereby simplifying the construction process and reducing costs.

Furthermore, in the liquid crystal display of the present invention, the convex protrusions are also formed on the back case and made to come into contact with the earth contacts provided on the circuit board, so that the earth terminals in effect thrust the circuit board downward while they come into elastic contact with the earth contacts, while on the other hand, the multiple convex protrusions on the back case push up the circuit board. Consequently, good contact is established between the earth terminals and the earth contacts even if vibration or the like occurs when the liquid crystal display is in use, likewise providing stable support to the liquid crystal drive circuit board.

BEST MODE FOR IMPLEMENTING THE INVENTION

The embodiments of the present invention will hereafter be described with reference to the accompanying drawings.

Figure 1:
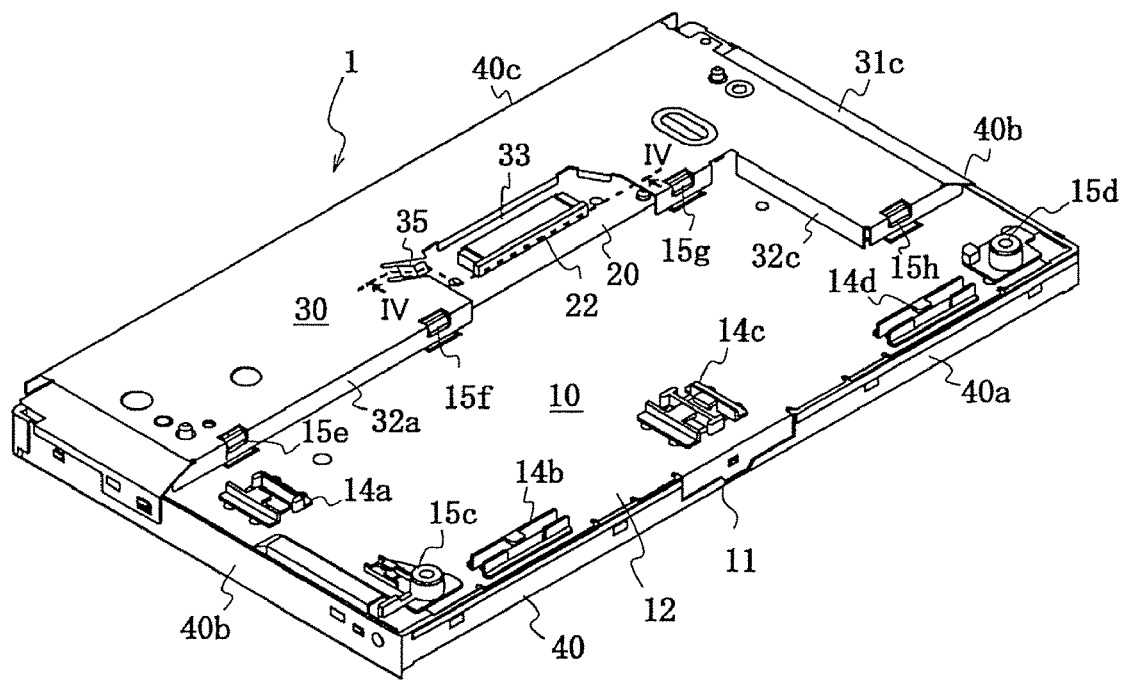
FIG. 1 shows an embodiment of the liquid crystal display of the present invention, and is a perspective of the liquid crystal display viewed from the back.
Figure 2:
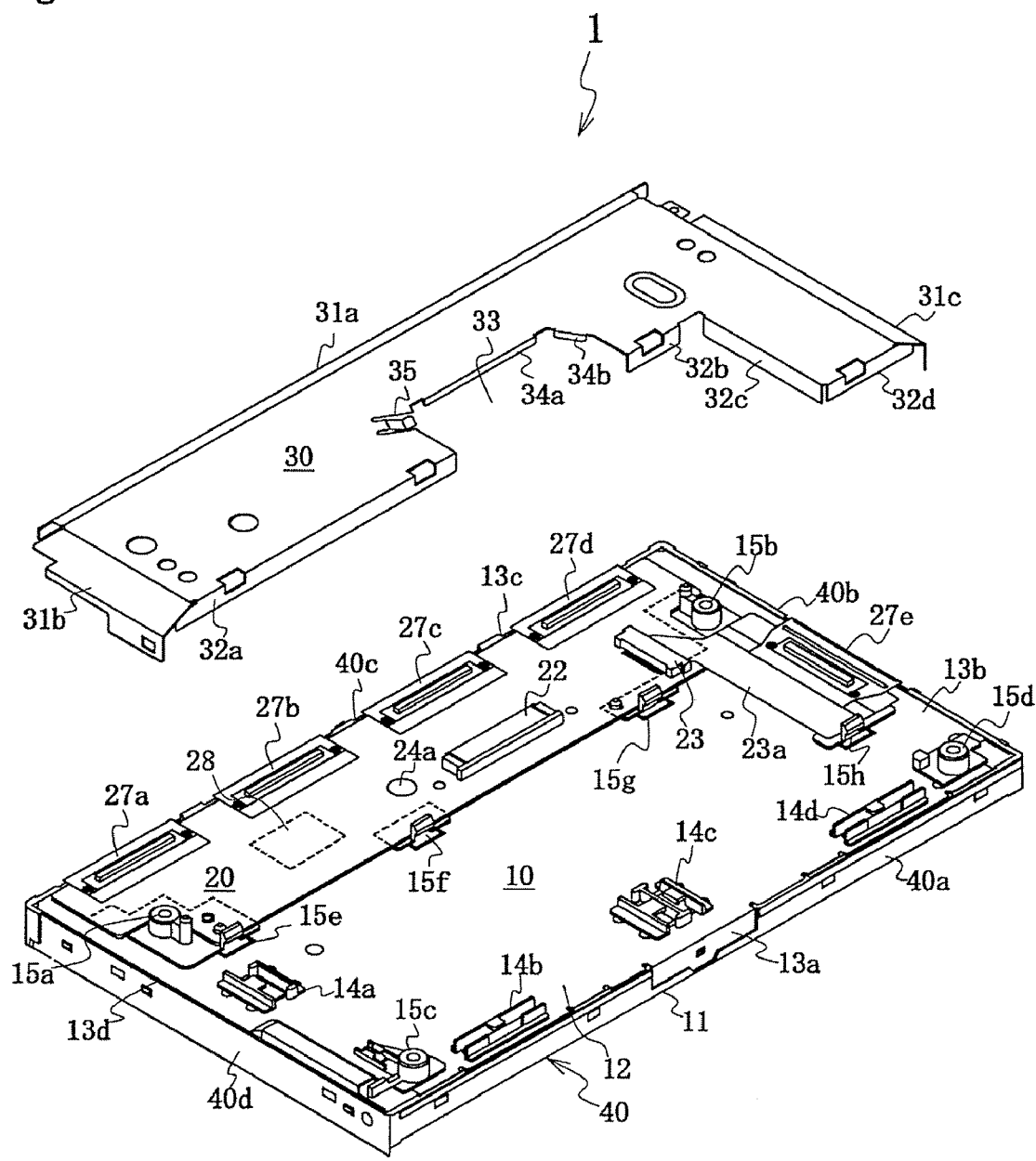
FIG. 2 is an exploded perspective view of the liquid crystal display shown in FIG. 1 in which the metallic cover (back lid) of the display is not in place.
Figure 3:
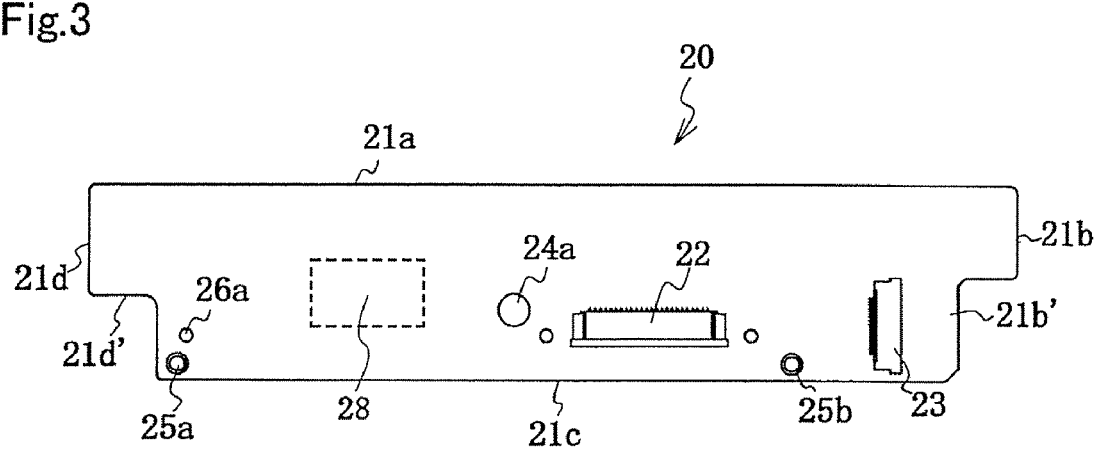
FIG. 3 is a plane view of the circuit board of the liquid crystal display of FIG. 1.
Figure 4:
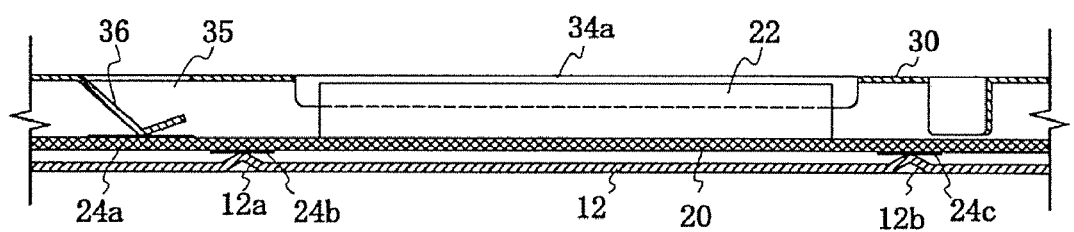
FIG. 4 is an enlarged sectional view of the line marked IV-IV in FIG. 1.
Figure 5:
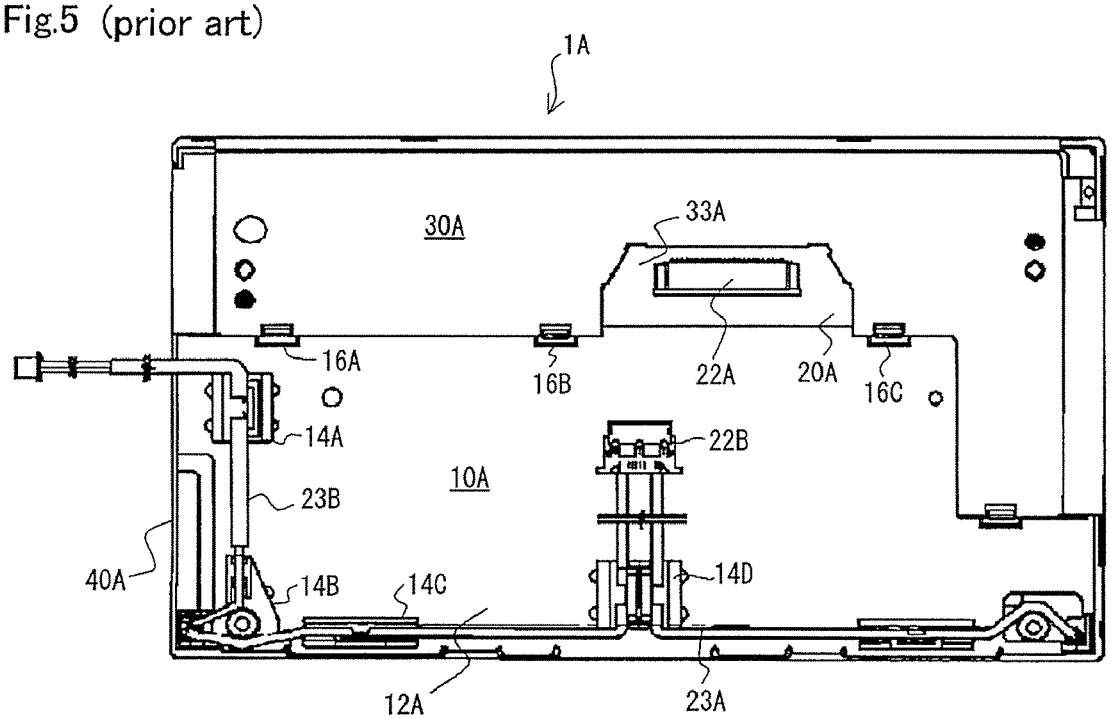
FIG. 5 is a plane view of a conventional liquid crystal display viewed from a backside.

FIG. 1 shows an embodiment of the liquid crystal display of the present invention, and is the perspective view of the liquid crystal display viewed from the back, while FIG. 2 is the exploded perspective view of the liquid crystal display shown in FIG. 1 in which the metallic cover (back lid) of the display is not in place. FIG. 3 is a plane view of the circuit board of the liquid crystal display of FIG. 1, while FIG. 4 is an enlarged sectional view of the line marked IV-IV in FIG. 1.

The liquid crystal display 1 comprises a substantially rectangular liquid crystal module 10, a liquid crystal drive circuit board 20 mounted on the backside of the liquid crystal module and electrically connected to and extending from one peripheral edge of the liquid crystal module 10 for a predetermined length toward a central area, which is about ⅓ to ½ the distance to the opposite peripheral edge, a metal cover 30 covering the liquid crystal drive circuit board 20, and a frame 40 covering the periphery of the laminated structure consisting of the liquid crystal module 10, the liquid crystal drive circuit board 20 and the like.

The liquid crystal module 10 comprises a liquid crystal display device consisting of two transparent glass substrates filled with and sealed by liquid crystal, an optical sheet such as a diffusion sheet arranged under the device, a backlight unit equipped with a light source, and the like. A back case 12 formed of metal having predetermined conductivity is arranged on the backside of the liquid crystal module 10, while fasteners 14a to 14d for fixing electric cables or the like, protruding portions 15a to 15d for affixing the metal cover 30 or the like, and locking protrusions 15e to 15h engaged with the openings of the metal cover 30 are disposed on predetermined positions on the surface of the device. Further, on the backside thereof, multiple convex protrusions, that is, two protrusions 12a, 12b (refer to FIG. 4), for example, formed by machining or the like are disposed near corresponding portions on both ends of electric connectors (described later). The locking protrusions 15e to 15h are made of insulative resin material, and also function as spacers for supporting the metal cover 30 and the liquid crystal drive circuit board 20 at a predetermined gap to prevent them from directly contacting each other. Note that the back case 12 may be part of the backlight unit or constitute a separate body.

The frame 40 that consists of frame pieces 40a to 40d is attached to the periphery of the liquid crystal module 10. The frame 40 may be an integrated structure or may be formed by putting together separate frame pieces using a specific connecting device.

Further, the liquid crystal drive circuit board 20 is a printed circuit board substantially rectangular in shape having predetermined thickness and size as shown in FIG. 3. One side 21a is slightly longer than the opposite side 21c of the circuit board 20 in the longitudinal direction but the length of the sides 21a and 21c of the circuit board 20 are formed to be slightly shorter than the length of the sidewall 13c of the liquid crystal module 10 (refer to FIG. 2). The liquid crystal drive circuit board 20 is designed to fit the size of the back case 12 when it is mounted thereon. Furthermore, the short sides 21b, 21d of the circuit board 20 orthogonal to side 21c are cut at corners that respectively intersect with side 21c, to form cutouts 21b', 21d'. The cutouts 21b', 21d' are intended to make room for the protruding portions 15a, 15b that affix the metal cover 30 when the liquid crystal drive circuit board 20 is mounted on the back case 12 of the liquid crystal module 10.

Electronic parts (not shown), a power supply circuit (not shown) and the like are disposed on the liquid crystal drive circuit board 20 and two electric connectors 22, 23 are provided on the surface thereof. The electronic parts and the power supply circuit are connected to the liquid crystal module 10 via flexible wiring boards 27a to 27d. The electric connector 22 supplies electric power and various signals or the like for capturing images, while the connector 23 supplies scanning signals to the liquid crystal display device. Note that the electric connector 23 is connected to the liquid crystal module 10 via a flexible wiring board 27e.

The electric connector 22 is made to reside adjacent to a cutout 33 provided on the metal cover 30 while the connector 23 is located slightly right-of-center and installed near the short side edge of the metal cover 30. The electric connectors are electrically connected to the electronic parts and the like via predetermined wirings.

Further, an earth contact 24a of a predetermined shape is provided near the electric connector 22 while a timing controller 28 which consists of an integrated circuit device for driving the liquid crystal module is attached to the liquid crystal drive circuit board 20. However, it is preferable to locate the earth contact 24a between the timing controller 28 and the electric connector 22 for the reason that when clock signals emanating from the outside are supplied to a gate driver IC or the like via the timing controller 28, the impact created by noise to the timing controller 28 is greater than that made on the gate driver IC, a source driver IC or a reset IC.

Moreover, on the backside of the liquid crystal drive circuit board 20, additional earth contacts 24b, 24c (refer to FIG. 4) are provided at corresponding positions on both ends of the electric connector 22 attached to the surface of the liquid crystal drive circuit board 20. The terminals 24b, 24c are also connected to the electronic parts, the earth contact 24a and the like on the liquid crystal drive circuit board 20 to form a ground line.

Still further, the metal cover 30 is in a substantially inverse L shape so as to cover the liquid crystal drive circuit board 20 and a board 23a connected to the electric connector 23 as shown in FIG. 2. The metal cover 30 has a cutout portion 33 large enough to expose the electric connector 22 made to reside near the inner side edge of the cutout portion 33. In addition, the inner side edge of the metal cover 30 is substantially bent at 90 degrees to form a predetermined length, and the bent pieces 32a, 32b, 32c and 32d serve to provide a predetermined gap between the liquid crystal drive circuit board 20 and the metal cover 30 to eliminate unnecessary contact between the liquid crystal drive circuit board 20 and the electronic parts and the like mounted thereon.

Openings are made on the bent portions of the bent pieces 32a, 32b and 32d to form holes for engaging the locking protrusions 15e to 15h provided on the back case. The locking protrusions 15e to 15h have a predetermined height, and serve as spacers to prevent the metal cover 30 from electrically contacting the liquid crystal drive circuit board 20. Further, from among the locking protrusions 15e to 15h, the locking protrusion 15f adjacent to the earth contact 24a, acting as spacer, serves to provide support to the earth contact 24a even if the liquid crystal drive circuit board 20 is pushed downward when an earth terminal 36 comes into elastic contact with the earth contact 24a, such that the extent of bending is reduced, and moderate elastic contact is maintained, thereby enabling the formation of a stable ground line.

Further, the outer peripheral edge portions of the inverse L shape are also bent at a predetermined angle to form a predetermined length to form bent pieces 31a to 31c and openings are made thereon to form holes for engaging the protrusions or the like of the frame 40 when the liquid crystal module 10 and the liquid crystal drive circuit board 20 are stacked and the resulting laminated structure is covered with the metal cover 30.

The structure of the metal cover 30A for covering the liquid crystal drive circuit board 20 is cut out widely to form the cutout 33 by punching when press-working the metal cover 30, so as to expose the electric connector 22. The earth terminal 36, in the form of a flanged nail, is disposed on one corner 35 of the cutout 33 at the time of punching to form the cutout 33, thereby reducing the time of processing. As shown in FIG. 4, a base end of the earth terminal 36 is connected to the metal cover 30, with the terminal being bent halfway at a predetermined angle, and the end or tip of the terminal is free. Thus, when the liquid crystal drive circuit board 20 is covered with the metal cover 30, the bent portion of the earth terminal 36 comes into elastic contact with the earth contact 24a of the liquid crystal drive circuit board 20, and a predetermined ground line is formed.

The liquid crystal display 1 is assembled in the following manner using the liquid crystal module 10, the liquid crystal drive circuit board 20 and the metal cover 30.

Firstly, the periphery of the liquid crystal module 10 is framed using the frame pieces 40a to 40d. Then, the liquid crystal drive circuit board 20 is mounted on the back case 12 of the liquid crystal module 10, and the end portion of one side of the liquid crystal drive circuit board 20 is electrically connected to the liquid crystal module 10 by multiple flexible wiring boards 27a to 27d. Electric connection of the board 23a with the module 10 is similarly established through the flexible wiring board 27e.

After being mounted on the back case 12, the liquid crystal drive circuit board 20 is covered with the metal cover 30. The openings on the backside of the metal cover 30 are thus engaged with the locking protrusions 15e to 15h on the back case 12, and likewise, the bent pieces 31a to 31c are engaged with the protrusions or the like of the frame 40, and the liquid crystal display 1 device is thereby assembled.

As shown in FIG. 4, during assembly, the earth terminal 36 having elasticity elastically contacts the earth contact 24a on the liquid crystal drive circuit board 20 to form a good ground line. As a result, noise can be efficiently suppressed.

Further, the convex protrusions 12a, 12b formed on the back case 12 also come into contact with the earth contacts 24b, 24c of the liquid crystal drive circuit board 20. As a result, the earth terminal 36 pushes the liquid crystal drive circuit board 20 downward as it elastically contacts the earth contact 24a from above, while, the convex protrusions 12a, 12b on the back case 12 push the liquid crystal drive circuit board 20 upward, so that contact between the earth terminal 36 and the earth contact 24a improves and the liquid crystal drive circuit board 20 becomes stably supported.

In addition, by providing additional earth contacts 24b, 24c on one side of the liquid crystal drive circuit board 20 at corresponding positions on both sides of the electric connector 22 provided on the other side, further bending of the liquid crystal drive circuit board 20 can be prevented. Specifically, the liquid crystal drive circuit board 20 bends when an additional electric connector is inserted from the vertical direction. However, by providing protrusions at corresponding positions on both sides of the electric connector as described above, excessive bending can be prevented and a stable ground line can be formed. Note that the earth contacts need not be two in number but may be one or three or more.

As described above, according to the liquid crystal display device of the present invention, deterioration of display quality caused by noise interference can be reduced because a stable ground line is formed. Specifically, since noise is mainly generated in the vicinity of the electric connectors, the provision of earth contacts in areas where the electric connectors are disposed allows for the establishment of contact with the electronic parts or the like mounted on the liquid crystal drive circuit board to form the ground line, thereby efficiently suppressing noise generation. Further, since it is disposed on the edge of one side of the cutout for exposing the electric connector(s), the terminal can be simultaneously formed at the time of forming the cutout, thereby facilitating and simplifying the working process.

Furthermore, since the convex protrusions are formed on the backside of the back case and protrusions are allowed to come into contact with the earth contact provided on the liquid crystal drive circuit board, the earth terminal pushes the liquid crystal drive circuit board downward as it elastically contacts the earth contact from above, while, the convex protrusions on the flat panel push up the liquid crystal drive circuit board, resulting in improved contact between the earth terminal and the earth contact and stable support for the liquid crystal drive circuit board.

What is claimed is:

1. A liquid crystal display, comprising:
 a liquid crystal module having a predetermined shape and a back side covered by a metallic back case;
 a liquid crystal drive circuit board mounted on the metallic back case and electrically connected to the edge of one side of the liquid crystal module, extending from the peripheral edge toward the central portion by a predetermined length;
 an electric connector(s) attached near the peripheral edge of the liquid crystal drive circuit board; and
 a metallic cover provided with a cutout large enough to expose the electric connector(s) and cover the liquid crystal drive circuit board,
 wherein an earth terminal is provided on one peripheral edge of the cutout portion of the metal cover, and the earth terminal is brought into elastic contact with an earth contact provided on one side of the liquid crystal drive circuit board, and wherein multiple protrusions are formed on the metallic back case and come into contact with earth contacts provided on a second side of the liquid crystal drive circuit board.

2. The liquid crystal display according to claim 1, wherein an integrated circuit device is provided on the liquid crystal drive circuit board and the earth contact on the one side of the liquid crystal drive circuit board is disposed between the integrated circuit device and the electric connector(s).

3. The liquid crystal display according to claim 2, wherein said integrated circuit device is a timing controller for driving the liquid crystal module.

4. The liquid crystal display according to claim 1, wherein the liquid crystal drive circuit board is mounted on the metallic back case while a spacer having a predetermined height is laid at least between the vicinity of the location of the earth contact on the one side of the liquid crystal drive circuit board and the metallic back case.

5. The liquid crystal display according to claim 4, wherein the spacer forms part of a locking protrusion for affixing the metal cover.

6. The liquid crystal display according to claim 1, wherein the number of earth contacts provided on the second side of said liquid crystal drive circuit board is greater than one below or within the vicinity of the lower part of the connecting surface of the electric connector(s).

7. A liquid crystal display, comprising:
a liquid crystal module having a predetermined shape and a backside covered by a metallic back case;
a liquid crystal drive circuit board mounted on the metallic back case and electrically connected to the edge of one side of the liquid crystal module, extending from the peripheral edge toward the central portion by a predetermined length; and;
an electric connector(s) attached near the peripheral edge of the liquid crystal drive circuit board,
wherein multiple earth contacts and multiple protrusions are provided on one side of said liquid crystal drive circuit board and the metallic back case respectively, whereby each of the earth contacts comes into elastic contact with the multiple protrusions to mount the liquid crystal drive circuit board onto the metallic back case.

8. The liquid crystal display according to claim 7, wherein the multiple earth contacts provided on the liquid crystal drive circuit board are disposed below or within the vicinity of the lower part of the connecting surface of the electric connector(s).

9. The liquid crystal display according to claim 7, wherein the liquid crystal drive circuit board is mounted on the metallic back case while a spacer having a predetermined height is laid between the circuit board and the metallic back case.

* * * * *